Patented May 1, 1951

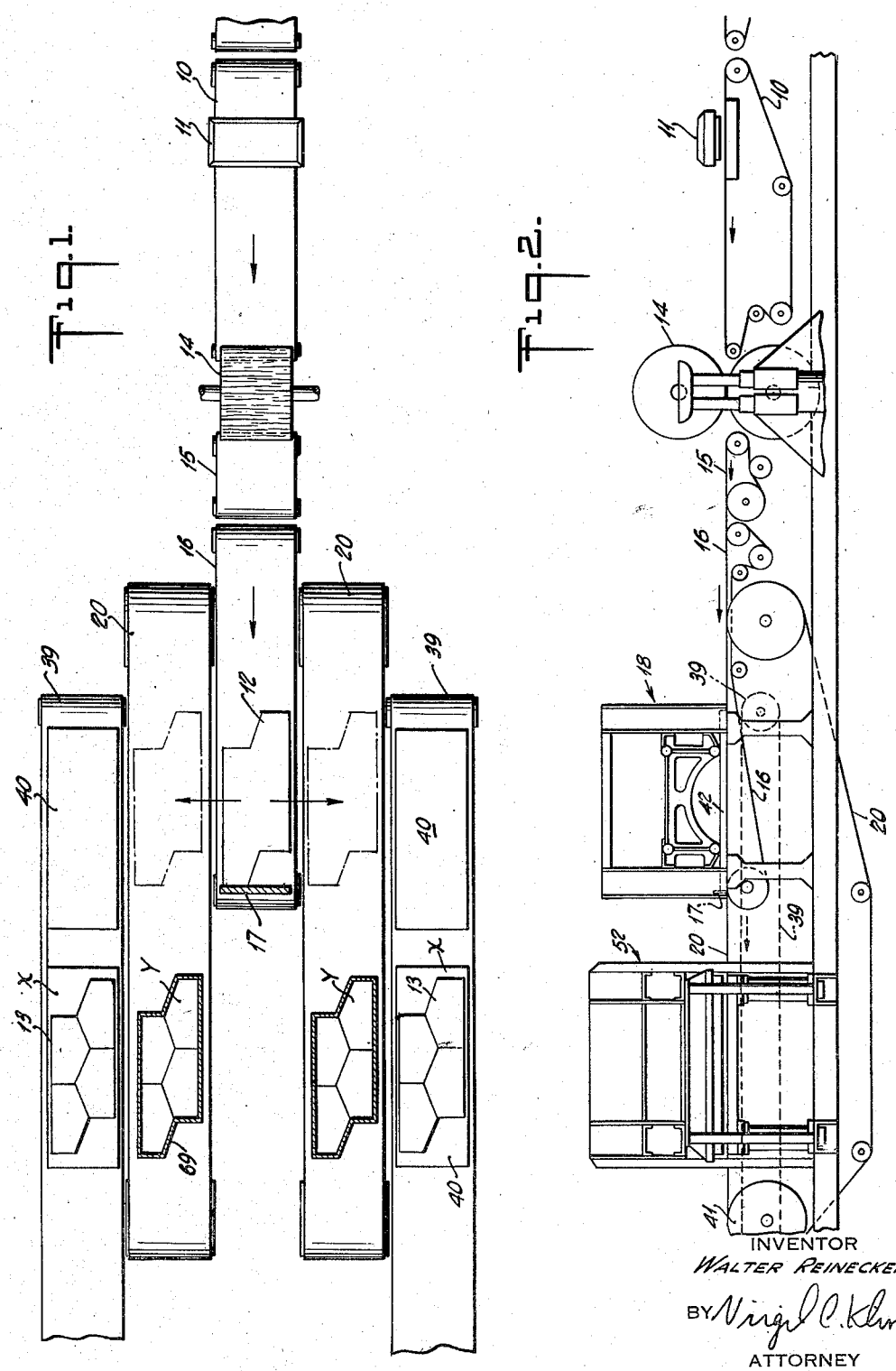

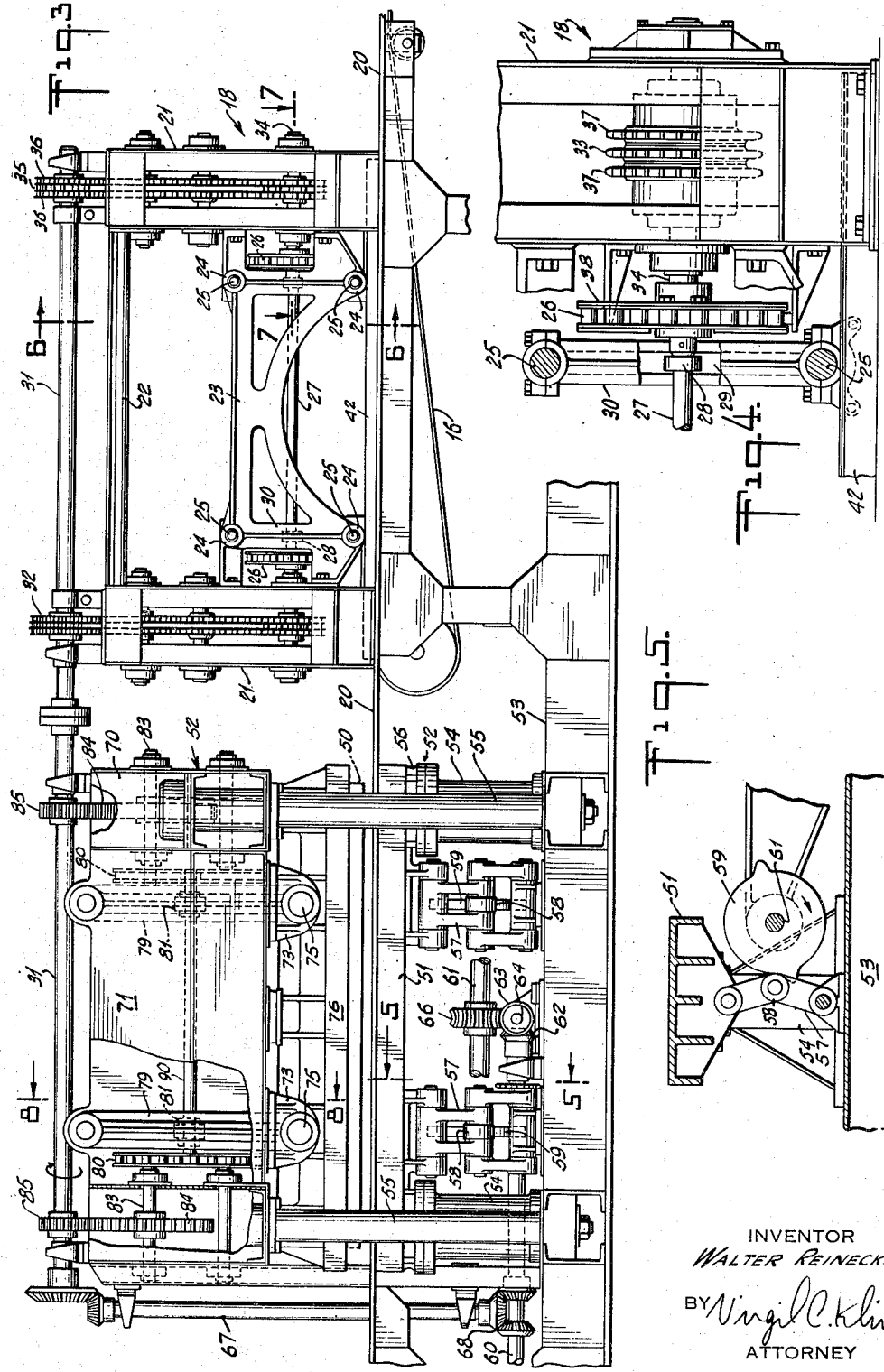

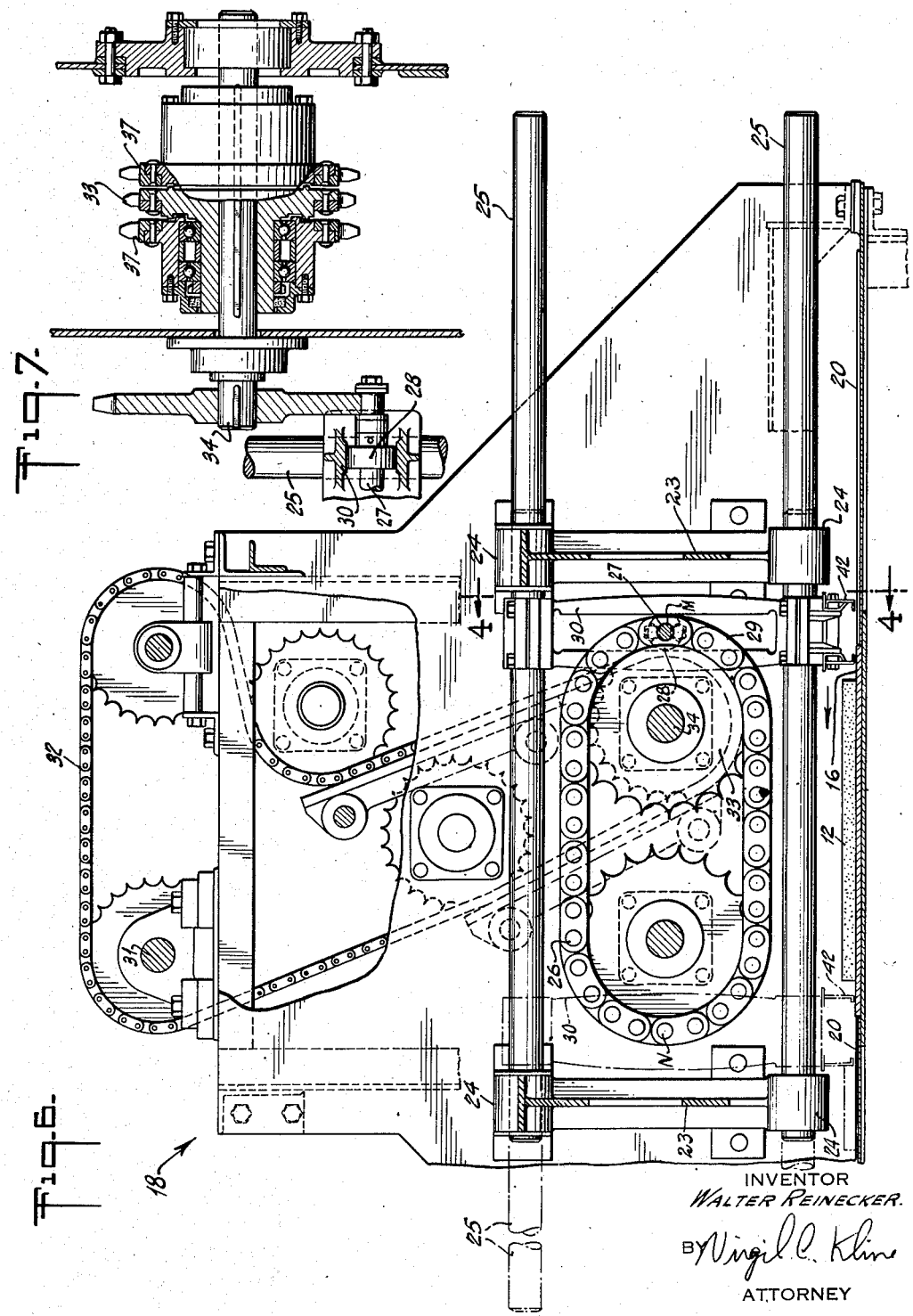

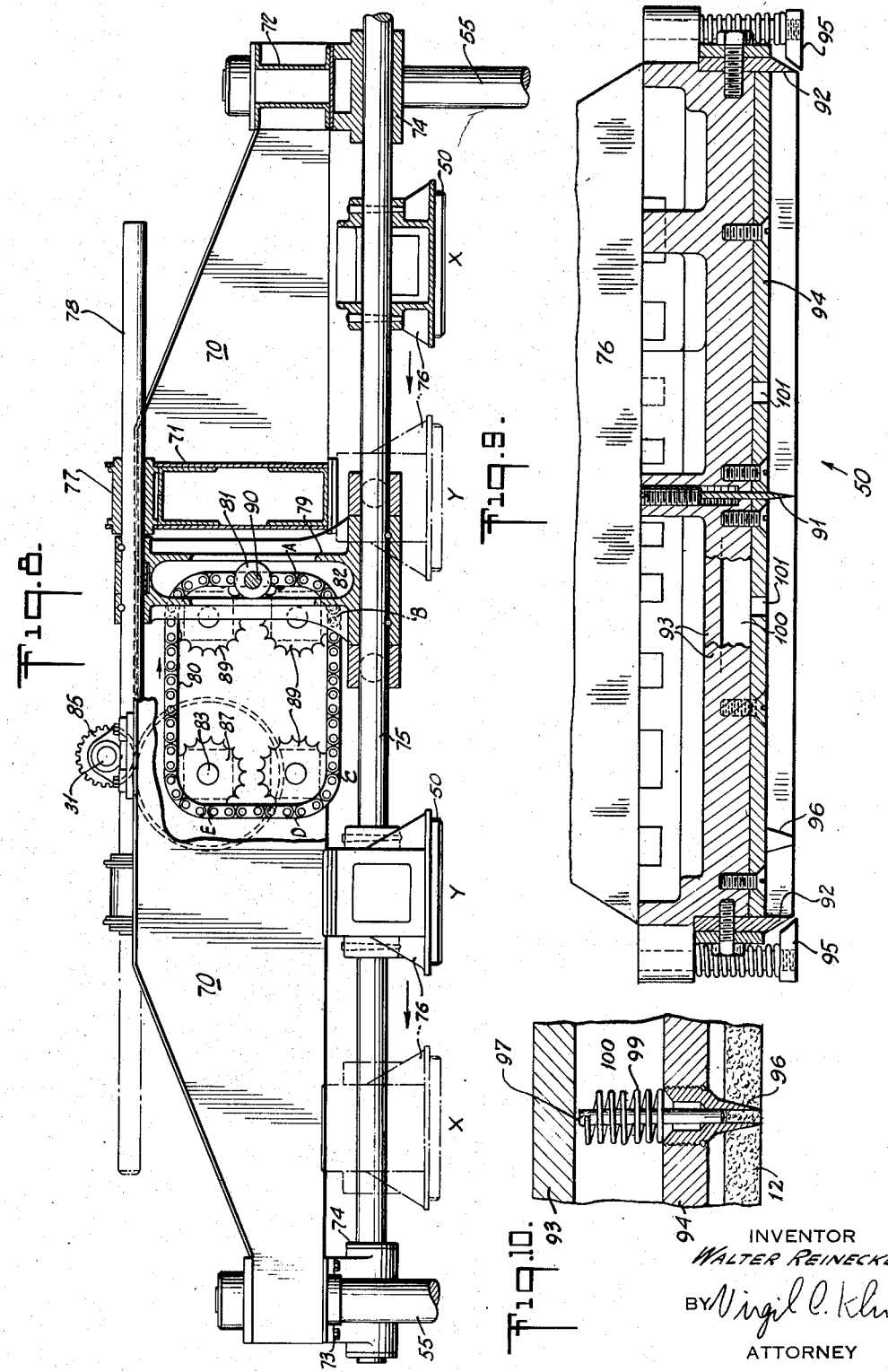

2,550,862

UNITED STATES PATENT OFFICE 2,550,862

METHOD AND APPARATUS FOR MANUFACTURING ASBESTOS-CEMENT SHEET PRODUCTS

Walter Reinecker, North Plainfield, N. J., assignor to Johns-Manville Corporation, New York, N. Y., a corporation of New York Application February 23, 1946, Serial No. 649,726

13 Claims. (Cl. 164—20)

This invention relates to the manufacture of hard and dense fibro-cementitious sheet products, and is particularly concerned with improvements in process and apparatus for manufacturing asbestos-cement shingles and siding sheets.

The invention is directed to improvements in method and apparatus such as are designed for practicing a conventional process such as the following: Selected proportions of shingle grade asbestos fibers and finely divided Portland cement are dispersed in a carrier air stream, and the dispersed materials are passed through a fluff box before depositing them in a dry condition upon a conveyor belt. Finely divided silica is frequently included in the composition. There is thus formed on the belt a dry mixture layer of such thickness as to produce, after subsequent steps in the process, a finished sheet or shingle of desired caliper. The layer of dry materials is approximately levelled, and air is expressed therefrom by compression effected by perforate hollow rollers. Water is added thereto by spray application. The wetted layer of material is smoothed and partially consolidated by passing beneath pressure rolls. The layer is then severed into segments by means of a cutter, and such segments are subjected to a high degree of consolidation by application of pressures of the order of at least about 8000 lbs. per square inch, by means of a hydraulic press. The green segments are removed from the press and subjected to a partial air curing operation of many hours' duration, followed by trimming or cutting of the partially cured sheet to final dimensions. The resulting shingles or sheets are subjected to final curing and drying treatment.

The rate at which shingles and siding sheets can be manufactured in accordance with prior conventional practice has been limited by the length of the initial air curing cycle to which the green uncured sheet segments have been subjected to impart sufficient coherence and strength to enable them to withstand conventional handling, punching and trimming operations. Moreover, because of this inherent weakness in the green uncured sheets it has not been considered practical to attempt to increase substantially the sizes or areas of the individual sheet segments which are handled. This is particularly true with respect to operations producing individual segments of comparatively large size as, for example, those of not to exceed ½ inch thickness and of greater area than say 30 inches in length and 14 inches maximum width.

A primary object of the present invention is to provide method and apparatus whereby the rate of production of shingles and siding sheets may be considerably increased and simplified as compared to prior conventional practice, and whereby manual operations are largely eliminated while holding to a minimum the wastage of material. A more specific object is that of providing process and apparatus which are adapted for performing mechanical handling, cutting and trimming operations on green uncured asbestos-cement sheet segments of greatly enlarged surface size as compared with any handled by conventional practice, without deforming said segments.

With the above objects in view, the invention consists in the improved method and apparatus which is hereinafter described and more particularly defined by the accompanying claims.

In the following description reference will be made to the attached drawings, in which:

Fig. 1 presents a diagrammatic plan view of portions of an apparatus assembly that is adapted for practicing the improved method of the present invention;

Fig. 2 is a diagrammatic longitudinal elevation of an apparatus assembly including elements portrayed in Fig. 1;

Fig. 3 is an enlarged side elevation, with parts broken away, of transfer carriage and punch press elements of the apparatus of Fig. 2;

Fig. 4 is a vertical section, with parts in elevation, of a portion of the drive mechanism for the transfer carriage, taken on plane 4—4 of Fig. 6;

Fig. 5 is a vertical section taken on the plane 5—5 of Fig. 3, with parts appearing in end elevation, showing the plunger actuating elements of the punch press;

Fig. 6 is a view in vertical section taken on the plane 6—6 of Fig. 3 (with parts appearing in end elevation and parts broken away) showing the actuating elements of the transfer carriage;

Fig. 7 is a horizontal sectional view, with parts shown in elevation, of parts of the mechanism of Fig. 6, taken on the plane 7—7 of Fig. 3;

Fig. 8 is a view in vertical section along the plane 8—8 of Fig. 3, with parts appearing in end elevation and parts broken away, showing the die actuating element of the press;

Fig. 9 is an enlarged view in vertical section through the die element of the punch press; and Fig. 10 is an enlarged vertical section of a small portion of the punch press die portraying the mounting of a nail hole punching pin.

Referring to the assembly views (Figs. 1 and 2), 10 designates an endless conveyor adapted to carry on its top surface a partially compacted, continuous sheet strip of frangible plastic composition such as moist compressible asbestos-cement. The composition of the sheet strip and the manner of its formation may be such as hereinbefore described or as described as taking place in the disclosure of the patent of George W. Brown #2,230,880 for Apparatus for Making an Asbestos Product. Mounted over the conveyor in a position which may correspond with the position occupied by the cutter of the Brown patent disclosure, there is shown diagrammatically a reciprocable severing knife or cutter 11. As the continuous sheet strip is advanced beneath the cutter, sheet segments 12 of comparttively large area are severed therefrom. Segments 12 are fed by conveyor 10 through the bight of a pair of opposed high compression rolls 14 which effect final consolidation of the sheet segments under pressures of as much as 8,000 lbs. or more per square inch. The face of the upper roll 14 may bear a pattern adapted to impress a corresponding embossed pattern on the top surfaces of the sheet segments 12 as they pass through the bight of the press rolls.

In passing the press rolls 14, the sheet segments 12 are transferred from conveyor 10 to a conveyor 15 which is operated at an increased rate of speed. The increased speed of the second conveyor takes care of increased elongation of a sheet segment effected during its passage between the press rolls. From conveyor 15 the segments are transferred to another endless belt conveyor 16 which operates at a substantially increased rate of speed over that of conveyor 15, for the purpose of developing substantial space intervals between successive sheet segments delivered to the conveyor.

The consolidated sheet segments 12 which are delivered to conveyor 16 remain on this main conveyor until their advance is arrested by contact with a removable stop 17. Stop 17 is located a short distance in front of the delivery end of conveyor 16. In starting the machine, stop 17 may be temporarily removed to permit the first sheet segments delivered to the conveyor to be carried forward beyond the normal stop position and discharged to a screw conveyor (not shown) which initiates return of scrap material to be reclaimed. When stop 17 is in place, a transfer carriage 18 (Fig. 2) operates to remove successive sheet segments laterally from the main conveyor 16 alternately to the right or to the left, onto the surfaces of one of two parallel punching belts 20. Punching belts 20 are endless belts which operate only intermittently.

The transfer carriage 18 (Fig. 3) comprises two side frame members 21 connected by top cross members 22 and bottom cross members 23. The bottom cross members each support four slide bearings 24. These bearings journal four reciprocating slide bars 25. Reciprocating motion is imparted to the bars 25 through the medium of a pair of 2" pitch roller chains 26 which are mounted in spaced vertical planes, and parallel links of which are operatively connected by a bar 27 (Fig. 4). Bar 27 in turn carries two spaced rollers 28. The rollers are respectively journaled in vertical slots 29 in two spaced castings 30 (Figs. 6 and 7). Castings 30 are tightly clamped to the bars 25, so that as the rollers 28 reciprocate up and down in the slots 29 through actuation by the chains 26, the bars 25 and castings 30 are forced to reciprocate horizontally between the solid line and dash line positions of castings 30 which are shown in Fig. 6.

The transfer carriage 18 is powered from a constant speed drive shaft 31 (Fig. 6) by means of two 1" pitch three strand width roller link chains 32 each of which is employed to operate a driven sprocket 33 (Figs. 4 and 7). Each triple chain is used to convert constant speed movement of drive shaft 31 to intermittent movement of a driven shaft 34 to which sprocket 33 is keyed. Only an inner strand 35 of each triple chain engages the teeth of sprocket 33, and a sufficient number of roller links are removed from spaced sections of this inner strand to develop any desired intermittent motion of sprocket 33, providing periods of rest of adjustable length for the carriage at each end of its path of travel. The sprocket 33 turns only when its teeth are engaged by chain rollers of strand 35. No links are removed from the outer strands 36 of the triple chain, but the two sprockets 37 which are engaged by these outer strands are journaled as idlers on the hub of the inner sprocket 33, so that these idling sprockets may operate continuously while the inner sprocket, which is the only one keyed to the driven shaft, operates only intermittently. A drive sprocket 38 for one of the roller chains 26 is keyed to each shaft 34.

The punching belts at the right and left of the main conveyor 16 are at rest during the period of lateral transfer of a sheet segment 12 at the stop position from the main conveyor to a stationary punching belt surface. The punching belts are supported in the same horizontal plane as the conveyor 16 and in closely adjacent relation thereto. As soon as transfer is completed, the punching belt to which a segment is transferred advances the same from the transfer position into a punching position Y between an upper die 50 and a lower plunger table 51 of a punch press 52 (Fig. 5).

There are two punch presses, each of which is operatively associated with one of the two punching belts. A structural base 53 mounts four supporting castings 54 and four supporting columns 55. The four columns support a reciprocable carriage (Fig. 8) which in turn mounts the upper die elements 50 of the two punch presses. The four castings 54 are mounted in horizontally spaced pairs, and each pair serves as journal guides for the ends of a reciprocating punch table 51. Each punch table is a heavy casting which is machined on the top face to provide a solid smooth backing for one of the punching belts 20 which, preferably, is an alloy steel belt. During the punching operation the upper face of the belt 20 functions as the punching face of the press, and the belt is always on top of the punch table, both while the belt is moving and while it is at rest. The die element 50 of a punch press is held stationary during the punching operation, and the die face is mounted in inverted position over the punching belt. Two guides 56 are attached to each punch table, and these guides are journaled in the paired castings 54, thus insuring correct alignment of the punch table.

Each punch table is linked by two pairs of toggles 57 to the machine base (Fig. 5). Each pair of toggles carries a cam follower 58 which follows a driving cam 59. The driving cams 59 are continuously rotated at a constant speed, and rotation of the cams, in turn, pushes the toggles periodically into straight line position, thereby moving a punch table upwardly, and thus pushing a sheet segment 12 at position Y into the die 50 while supported by the punching belt. The cam shaft mechanism for the punch tables is actuated through a main shaft 60 which is driven by a constant speed motor. The main shaft carries a bevel gear 62 which, in turn, engages a bevel gear 63 on a worm shaft 64. The worm shaft is provided with two spaced worms, each of which engages a cam shaft worm gear 66. There are two cam shafts 61 driving four cams 59.

Actuation of the die supporting element of the punch presses periodically as a transversely reciprocating carriage, is effected through the medium of a vertical shaft 67 which is driven from the common main shaft 60 through a set of bevel gears 68. This vertical shaft transmits power through shaft 31 both to the upper part of the punch press and to the transfer carriage 18. Referring to Figs. 3 and 8, the four columns 55 of the punch press support two main side frame members 70 which are connected by cross members 71, 72, thus providing a rigid top construction. Cross members 72 support brackets 73 which, in turn, supports bearings 74 for horizontally reciprocating slide bars 75. The slide bars 75 carry die supporting castings 76. Each cross member 71 of the frame carries two slide bearings 77 to guide auxiliary slide bars 78. The main and auxiliary bars 75, 78 are mounted in vertically spaced pairs, and the paired bars are rigidly connected with each other by slide castings 79. The bars and castings make up a rigid slide which reciprocates in the direction of the center line of the bars. This reciprocating movement is initiated by chain drives 80 which transfer their motion to the slide by means of rollers 81. Each side frame member 70 is equipped with one drive shaft 83. Keyed to each drive shaft is a spur gear 84, and each spur gear meshes with a pinion 85 which is keyed to the upper drive shaft 31. Each drive shaft 83 carries a sprocket 87 which is the driving sprocket for one of the two endless 2" pitch roller chains 80. Each chain travels on idler sprockets 89, and parallel links of the two roller chains 80 are connected by a bar 90 which carries two rollers 81. These rollers reciprocate in slots 82 in slide castings 79 when the chain is moving.

Since the shingle slabs 12 are not cured before being punched, the actual punching operation is carried out on slabs which are wet and structurally weak. The type of die 50 which is used for this purpose may be termed a "steel rule" die, although the steel rules are replaced by trimming knives with bevelled cutting edges. Each die has trimming knives arranged to cut out four shingle or siding sheet blanks 13 from an individual sheet segment 12. The inside trimming knives 91 (Fig. 9) are bevelled on both sides. The outside knives 92 are bevelled on one side only. The knives 91 and 92 are removably fixed to a hollow face section 93 of die casting 76, with the cutting edges extending forwardly of a die plate 94. Retractable spring mounted stripper plates 95 are positioned around the periphery of the die at the outside of the knives 92.

Hollow cylindrical nail hole punching members 96 may be mounted with their cutting edges extending forwardly of the die plate 94, and a pusher pin 97 is supported by a retractable coil spring mounting within the bore of each punching member 96 (Fig. 10). Pusher pin 97 normally projects forwardly to the cutting edges of member 96, but is forced to retract within the bore against the compression of spring 99 during the punching operation, when a cylindrical slug is cut from the shingle. When the punching operation is completed by release of upward pressure on the punching table 51, pin 97 is pushed downward by its spring to eject the slug through the holes previously cut in the shingle, thereby cleaning the punching member 96 preparatory to the next punching operation.

Between die plate 94 and die casting face 93 is an air chamber 100. Plate 94 is perforated at intervals with holes 101. During a punching operation the wet shingle enters the die, while the waste trim material 69 (Fig. 1) around the periphery of the segment 12 is sheared off by the operation of strippers 95 and retained on the belt 20 for return to the process. The four shingles 13 remain in the die until the die transfers them to stacking position on one of two shingle discharge conveyors 39. This transfer is accomplished by keeping chamber 100 under vacuum operating through apertures 101, to hold the shingles inside the boxes formed by the die knives during this die transfer operation.

As soon as a die 50 is shifted from punching position Y to stacking position X over a discharge conveyor 39, the vacuum maintained in chamber 100 during this transfer operation is changed to pressure, the amount of pneumatic pressure applied being sufficient to eject the shingles 13 out of the die and to stack them on a pallet 40 in stacking position. Alternate vacuum and pressure conditions can be maintained in chamber 100 through a single air line leading thereinto and provided with an automatically controlled valve connecting the chamber alternately with sources of suction or pressure.

A single constant speed motor may be employed for actuating all elements of the apparatus including transfer carriage 18, punch press 52, and the various conveyor belts including belts 20 and 39. Belts 20, for example, may be powered from the main drive shaft 60 through a three strand roller link chain (not shown) having roller links removed from its middle strand for operation on the same principle of the chain 32 which develops intermittent actuation of the transfer carriage. Such middle strand engages a sprocket wheel or the like keyed to the shaft on which a pulley 41 is operated. A three strand chain drive of this type provides means for correctly synchronizing the operations of belts 20 with the operations of the transfer carriage and of the punch press. With the operations of the belts synchronized, each belt 20 delivers a segment 12 from the carriage 18 to one of the punch presses 52, and discharges waste trim over the end of the belt for final disposal or return.

The discharge conveyors 39 are designed to operate intermittently in synchronized relation with the operations of the belts 20 and of the punch presses 52. Each conveyor 39 periodically delivers an empty pallet 40 to a stacking position vertically aligned with the transfer path of the adjacent punch press die unit. The present operating plan is to retain a pallet 40 in position X while building up superposed shingle blanks 13 into a stack of as many as 15 blanks. Consequently conveyors 39 are operated at a much slower periodic cycle than is used for the operation of punching belts 20. As soon as a suitable number of shingle blanks have been stacked on a pallet 40 at stacking position X, the supporting belt 39 is operated to move the loaded pallet out of position X and to move an empty pallet into stacking position. The loaded pallets are conveyed to air or steam curing zones to develop a hardening set of the shingles.

The method and apparatus of the present invention are designed to substantially increase the rate of production of asbestos-cement shingles of a given size and shape by handling green, uncured segments 12 which may be of much greater area than it has been heretofore considered practical to handle in this general form of shingle molding unit. For example, a continuously operating conveyor 10 may deliver to a cutter 11 a partially consolidated, moist asbestos-cement sheet strip having a width of approximately 23½ inches. Cutter 11 initially cuts from this strip a segment 12 having zig-zag cut edges, and dimensioned so that four shingle blanks may be cut therefrom. Each segment may be cut to an overall length of 76½ inches. After the final trimming operation by the punch press 52, each of segments 12 furnishes four shingles 13 each having a maximum length of 30 inches and a maximum height of 14 inches. The punch press trims from each segment a peripheral border strip 69 of ¾" width.

To allow time for the transfer carriage 18 to operate between delivery thereto of successive individual segments 12, each segment passing the bight of the press rolls 14 is sped up by the operations of belts 15 and 16. For example, the belt which feeds the shingle segment to the press roll 14 may operate at a speed of about 22 inches per second, while belt 15 is operated at a speed of about 24½ inches per second. Most of this difference in speed is needed to take care of slab elongation developed under the high pressures imposed by the press rolls 14. However, as soon as the slab has passed the press rolls it speeds up, and runs away to some extent from the next following slab. As the slab is transferred from conveyor 15 to conveyor 16, it is further speeded up to develop a suitable time-space interval between it and the succeeding slab which is sufficient to permit carriage 18 to shift the first slab to the right hand belt 20, for example, and to assume a position for shifting the succeeding blank segment 12 over to the left hand belt 20 as soon as such second segment arrives at transfer position abutting the stop member 17 (Fig. 1).

As soon as a segment 12 is arrested by coming in contact with stop 17, one of two pusher plates 42 (Figs. 3 and 6), which are bolted to and extend downwardly from castings 30, engages that edge of the segment 12 which lies in the path of movement of the pusher, and pushes the segment laterally off conveyor 16 in a direction in which the slide bars 25 of the carriage are moving at the time. As shown in Fig. 6, lateral transfer takes place of the green shingle blanks 12 from conveyor 16 to the top surface of one of the belts 20, without subjecting the shingle to any substantial mechanical stress or deformation. During this period the punching belt 20 to which the blank 12 is shifted is at rest. After completion of the transfer the punching belt starts to move and carries the slab 12 into punching position Y. Movement of the belt 20 is again arrested at this position, and in this arrested position punching takes place at the same time that another portion of the belt is free to accept transfer thereto of another segment 12 delivered by belt 16. Successive segments 12 delivered by belt 16, however, are not delivered to the same belt 20. Successive segments 12 are delivered alternately to the belts 20 at opposite sides of conveyor 16.

In view of the fact that the present invention contemplates mechanical handling and punching operations on moist uncured fibro-cementitious sheets of substantial area and which possess very low coherent strength, provision is made for fully supporting such sheets in horizontal position to protect them from deformation strains throughout such operations.

As shown in Fig. 6, the sheet segments 12 are continuously supported in horizontal position during the period when they are being shifted laterally off the main conveyor 16 onto one of the lateral punching conveyors 20. As an aid for avoiding development of stress or strain within the segments 12, provision is made for operating transfer carriage 18 on a shifting cycle with harmonically accelerated and decelerated movement adjacent starting and stopping points. With pusher 42 moving to the left from a starting position in which it is portrayed in Fig. 6, the length of the path of traverse of the pusher 42 is measured by the length of the major axis of the elliptical path which is followed by those links of chains 26 to which rollers 28 are operatively connected. The cycle includes an initial period of gradually accelerating movement toward the left, as the roller moves downwardly within its slot in casting 30. This period of accelerating movement is followed by a period of movement at constant rate toward the left, during which the roller remains in stationary position at a point near the bottom of the slot. The period of movement at constant rate is followed by a period of gradual deceleration as the roller moves upwardly in the slot to a central stop position aligned with the point N, representing the point of maximum advance of the carriage toward the left. As soon as the roller reaches the point N, a period of rest of the carriage may be developed by removing links from strand 35 of chain 32. After this period of rest reverse movement begins. The reverse movement includes successive periods of gradual acceleration, movement at constant rate, and then a period of gradual deceleration returning the pusher 42 to the initial position illustrated in vertical alignment with the point M on the main axis of the elliptical path of chain 26. During this reverse movement another segment 12 is shifted to the right from the top of conveyor 16 to the surface of right hand conveyor 20.

The length of the cycle of the carriage 18 is adjusted by removing links at spaced portions of the inner strand 35 of the three strand drive chain 32. The length of this chain is sufficient to include a full forward and reverse cycle of carriage 18, and the length of any periods in which the carriage is held at rest can be adjusted by adjusting the numbers and spacings of omitted links in its inner strand 35.

The length of the travel path of the carriage element of the punch press, i. e. the length of path of traverse of each punch die 50, is measured by the length of the horizontal axis of the path which is followed by those links of chains 80 which are linked by bar 90, as portrayed in Fig. 8. The traverse cycle of the punch press carriage resembles the traverse cycle of the transfer carriage 18 in providing for periods of rest of some length for the dies 50 at each end of the traverse path. Any difference in cycle is determined in part by the difference in the shape of the path of travel of the links of the chain 80, as compared to the elliptical path of travel followed by the links of chain 26 through which carriage 18 is actuated.

Lateral movement of the two die elements of the punch presses are synchronized. In other words, the two die elements are rigidly connected and spaced apart so that if one die casting, for example that at the left side of the press as viewed in Fig. 8, is 27½ inches from the center line of the machine, the die casting on the right side may be 59½ inches from the same center line. The total length of the reciprocal path of the die elements may be 32 inches. Lateral movement of the die elements through a 32 inch path would bring each die alternately into positions 27½ inches and 59½ inches from the center line of the machine. The 27½ inch position would be punching position Y, and the 59½ inch position would be discharge and stacking position X.

Considering the die actuating mechanism which is portrayed in Fig. 8, the entire sliding unit including the dies, the bars 75 and 78 and the casting 79, begins to move to the left when roller or follower 81 reaches a point A. The movement starts at low acceleration and the acceleration increases up to the time that the roller reaches point B. From point B to point C motion is constant. From point C to point D the slide decelerates to come to a rest at point D. As the roller advances from point D to point E the slide, including casting 79, is at rest. When the roller reaches point E return movement begins, and the movement from left to right successively accelerates and decelerates in the same cycle previously followed from right to left, except for the difference in direction.

Since many variations may be made from the illustrative details given, without departing from the scope of the invention, it is intended that the invention should be limited only by the terms of the claims interpreted as broadly as consistent with novelty over the prior art.

What I claim is:

1. The method of manufacturing a plurality of uniformly dimensioned shingle blanks from an advancing continuous sheet strip of frangible plastic composition which comprises, transversely severing said strip along zig-zag lines at uniform spaced intervals to produce sheet segments each having a face area sufficient for forming parallel rows of multiple shingle blanks, each segment having a projecting tab at opposite severed edges, and each tab having a minimum width corresponding to the length of one side of a potential blank, said tabs being axially aligned with one of said rows, and punching out multiple blanks from said segments while trimming waste material from the peripheral borders thereof.

2. The method of manufacturing a plurality of uniformly dimensioned shingle blanks from an advancing continuous sheet strip of frangible plastic composition which comprises, transversely severing said strip at uniform spaced intervals to produce sheet segments each having a face area sufficient for forming parallel rows of multiple shingle blanks, speeding up the rate of advance of severed segments to develop a spacing between successive segments, and continuously supporting said segments against deformation while alternately shifting successive segments to the right and to the left of the main path of forward advance, advancing one of the shifted segments to a punching position, and punching out a plurality of shingle blanks therefrom.

3. In manufacturing multiple shingle blanks from continuously advancing spaced sheet segments of dense moist fibro-cementitious material, the method of insuring rapid feed of said segments to a pair of shingle blank trimming and punching presses which comprises, continuously supporting the segments against deformation while alternately shifting successive segments laterally to right and left from the main path of advance into a path aligned with one of the punching presses, and carrying out said shifting operation on a cycle which includes a gradually accelerating forward movement from a stationary start, followed by a period of uniform advance, which is in turn followed by a period of gradually decelerating rate of advance to a second position of rest.

4. The method of manufacturing asbestos-cement shingles which comprises, advancing a moist layer of asbestos-cement composition as a continuous sheet strip, transversely severing said strip at uniformly spaced intervals to cut segments therefrom, advancing said segments at an increased rate to develop a spacing therebetween, supporting each segment against deformation while punching therefrom a plurality of shingle blanks, retaining the blanks within the punching die while removing them to a stacking position, and stacking the blanks and curing them to develop a hardening set.

5. The method of manufacturing shingles from a continuous sheet strip of moist pressure-consolidated uncured fiber-cement composition which comprises, advancing said strip continuously at a predetermined rate, severing said strip material transversely at spaced intervals to produce segments, advancing severed segments at an increased rate to develop a spacing between successive segments, periodically arresting the forward advance of a segment and shifting it laterally while supporting it against deformation, supporting the segment while punching out therefrom a plurality of uniformly dimensioned blanks, and shifting the blanks laterally to a stacking position while discarding waste trim produced during the punching operation.

6. The method of manufacturing a plurality of uniformly dimensioned shingle blanks from a continuously advancing sheet strip of moist fibro-cementitious composition which comprises, transversely severing said strip at uniform spaced intervals to produce large sheet segments, speeding up the rate of advance of said severed segments to develop substantial spacing between successive segments, moving one of said segments to a punching position along a supporting surface, cutting out a plurality of shingle blanks from said segment by a punching operation while thus supported, and restraining the shingle blanks against vertical movement while shifting them laterally away from the punching position on a shifting cycle which includes a period of gradually accelerating movement, followed by a period of uniform movement, and ending with a period of gradually decelerating movement.

7. In apparatus for handling plastic sheet segments, a horizontal segment supporting surface, a carriage mounted over said supporting surface, a constant speed drive shaft, slide bars slideably journaled in bearings, castings with vertical slots rigidly connected to said bars, rollers journaled in said slots, endless link chains mounted in vertical planes and having their main axes extending horizontally, a shaft connecting one link of each chain and said rollers, and mechanism operatively connecting said drive shaft and said link chains.

8. A shingle making machine comprising, an intermittently operating endless belt conveyor, a punching press disposed in the path of said conveyor, said press comprising a die mounted in inverted position above the conveyor on a transversely reciprocable carriage, a vertically reciprocable punch plunger mounted below the conveyor in vertical alignment with the die in punching position, a constant speed drive shaft, actuating mechanism operatively connecting said shaft with the punch plunger, and mechanism operatively connecting said shaft with the die supporting elements of the carriage to effect transverse movement thereof between punching cycles.

9. A shingle making machine comprising, a continuously operating endless belt conveyor, two intermittently operating belt conveyors mounted in parallel at each side of the continuous conveyor, means for delivering sheet strip segments of plastic fiber-cement composition at uniformly spaced intervals on the surface of the continuous conveyor, a carriage mounted for reciprocation transversely over the surfaces of all three conveyors, a removable stop member mounted to arrest advance of a segment along the surface of said continuous conveyor at the point at which the path of said carriage traverses the surfaces of said conveyors, and punching presses disposed in the paths of each intermittent conveyor beyond the traverse path of said carriage, each press comprising an inverted die mounted above the intermittent conveyor, and a vertically reciprocable punch plunger mounted below the conveyor and in vertical alignment with the die in its punching position.

10. In a shingle making machine, a carriage mounted for reciprocating movement in a fixed path, a slot in said carriage extending at right angles to said path, a follower mounted for reciprocation in said slot, an intermittently rotating driven shaft, an endless link chain connected for rotation by said shaft and supported in taut elliptical position with its main axis paralleling the path of the carriage, and means connecting one link of said chain with said follower whereby rotation of the chain through a complete cycle develops forward and reverse movement of the carriage.

11. In a shingle making machine, a carriage mounted for reciprocating movement in a fixed path, and actuating means for said carriage comprising, a constant speed drive shaft, an intermittently rotatable driven shaft, a slot in said carriage extending at right angles to the carriage path, a roller journaled in said slot, an endless link chain of elliptical shape mounted in a vertical plane and having its main axis paralleling the path of the carriage, and a coupling arm connecting one link of said chain and said roller whereby rotation of the chain develops forward and reverse movement of the carriage on a cycle which includes a period of rest of adjustable length at each end of the path of carriage travel corresponding to periods of rest of the driven shaft, and between each period of rest an initial period of harmonically accelerating motion, followed by an intermediate period of constant rate motion, and terminating with a period of harmonically decelerating motion.

12. A shingle making machine comprising, two intermittently operating belt conveyors mounted in parallel, a carriage which is mounted for reciprocation transversely over the surfaces of both conveyors, a punching press disposed in the path of one of said conveyors, said press comprising a die mounted in inverted position above the conveyor on the carriage, a vertically reciprocable punch plunger mounted below said conveyor in vertical alignment with the die in punching position, a drive shaft, and mechanism operatively connecting said shaft with the die supporting carriage to effect transverse movement thereof between punching cycles.

13. A shingle making machine comprising, two intermittently operating belt conveyors mounted in parallel, a carriage which is mounted for reciprocation transversely over the surfaces of both conveyors, a punching press disposed in the path of one of said conveyors, said press comprising a die mounted in inverted position above the conveyor on the carriage, a vertically reciprocable punch plunger mounted below said conveyor in vertical alignment with the die in punching position, a drive shaft, mechanism operatively connecting said shaft with the die supporting carriage to effect transverse movement thereof between punching cycles, and means for applying vacuum and pressure alternatively to the die face at successive points in the path of transverse travel of the die and the supporting carriage.

WALTER REINECKER.

REFERENCES CITED

The following references are of record in the file of this patent:

UNITED STATES PATENTS

| Number | Name | Date |
|---|---|---|
| 267,574 | Mundell et al. | Nov. 14, 1882 |
| 896,478 | Stockman | Aug. 18, 1908 |
| 1,834,004 | Overbury et al. | Dec. 1, 1931 |
| 1,905,837 | Flink | Apr. 25, 1933 |
| 2,088,686 | Blanchard | Aug. 3, 1937 |
| 2,125,480 | Avery | Aug. 2, 1938 |
| 2,235,960 | Curtis | Mar. 25, 1941 |
| 2,352,339 | Olney | June 27, 1944 |